US012598171B2

(12) United States Patent (10) Patent No.: US 12,598,171 B2
Mukherjee (45) Date of Patent: Apr. 7, 2026

(54) SYSTEMS AND METHODS FOR FAST AND SIMULTANEOUS MULTI-FACTOR AUTHENTICATION USING VECTOR COMPUTING

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 197 days.

(21) Appl. No.: 18/520,054

(22) Filed: Nov. 27, 2023

(65) Prior Publication Data
US 2025/0175462 A1 May 29, 2025

(51) Int. Cl.
*H04L 9/40* (2022.01)

(52) U.S. Cl.
CPC .......... *H04L 63/08* (2013.01); *H04L 63/0861* (2013.01); *H04L 2463/082* (2013.01)

(58) Field of Classification Search
None
See application file for complete search history.

(56) References Cited

U.S. PATENT DOCUMENTS

| 10,187,374 B2 * | 1/2019 | Brannon | ............. | H04L 63/0815 |
| 10,375,119 B2 * | 8/2019 | Aronowitz | ............ | H04L 63/205 |
| 10,826,910 B2 * | 11/2020 | Disraeli | .................. | G06F 21/31 |
| 11,637,824 B2 * | 4/2023 | Mossoba | ................ | G06Q 20/40 |
| | | | | 726/18 |
| 2014/0095884 A1 * | 4/2014 | Kannavara | ............ | H04L 9/3239 |
| | | | | 713/186 |

(Continued)

OTHER PUBLICATIONS

Federico Sinigaglia, et al.; A Survey on Multi-Factor Authentication for Online Banking in the Wild; Journal of Computers & Security; Nov. 6, 2019.

(Continued)

*Primary Examiner* — Boris D Grijalva Lobos
(74) *Attorney, Agent, or Firm* — Banner & Witcoff, Ltd.

(57) ABSTRACT

Aspects of the disclosure relate to multi-factor authentication. A computing system may receive, from an authenticated entity, a plurality of authenticated inputs. Normalized authenticated inputs may be generated. An n-dimensional authenticated signature vector corresponding to the plurality of normalized authenticated inputs may be generated. A plurality of multi-factor authentication (MFA) inputs may be received. A plurality of normalized multi-factor authentication inputs may be generated. An n-dimensional multi-factor authentication vector corresponding to the plurality of normalized MFA input may be generated. There may be a determination of whether a distance between the n-dimensional authenticated signature vector and the multi-factor authentication vector not exceeding an authentication distance threshold. Based on the distance between the n-dimensional authenticated signature vector and the multi-factor authentication vector not exceeding the authentication distance threshold, an indication that the plurality of multi-factor authentication inputs have been authenticated may be generated.

20 Claims, 6 Drawing Sheets

(56) References Cited

U.S. PATENT DOCUMENTS

| | | | |
|---|---|---|---|
| 2015/0242601 A1* | 8/2015 | Griffiths | H04L 63/105 |
| | | | 726/5 |
| 2016/0180068 A1* | 6/2016 | Das | H04L 63/0861 |
| | | | 726/7 |
| 2020/0186522 A1* | 6/2020 | Apturkar | H04L 9/3231 |
| 2023/0316261 A1* | 10/2023 | Agbamu | G06N 3/09 |
| | | | 705/67 |

OTHER PUBLICATIONS

Tamara Saad Mohamed; Security of Multifactor Authentication Model to Improve Authentication Systems; Department of Computer Science Cihan University; Oct. 18, 2019.
Yogendra Shah, et al.; Multi-Factor Authentication as a Service; 3rd IEEE International Conference on Mobile Cloud Computing, Services, and Engineering; 2015.

* cited by examiner

100

MULTI-FACTOR INPUT
COMPUTING SYSTEM
102

AUTHENTICATION
COMPUTING PLATFORM
104

NETWORK 101

MACHINE LEARNING
MODEL TRAINING SYSTEM
108

102

AUTHENTICATION COMPUTING PLATFORM

210 ── ONE OR MORE PROCESSORS

212 ── ONE OR MORE MEMORY DEVICES

AUTHENTICATED SIGNATURE VECTOR
214

MULTI-FACTOR AUTHENTICATION VECTOR
215

TRAINING DATA
216

ONE OR MORE MACHINE LEARNING MODELS
218

220 ── ONE OR MORE STORAGE DEVICES

222 ── ONE OR MORE COMMUNICATION INTERFACES

SYSTEMS AND METHODS FOR FAST AND SIMULTANEOUS MULTI-FACTOR AUTHENTICATION USING VECTOR COMPUTING

TECHNICAL FIELD

Some aspects of the disclosure relate to authenticating multi-factor authentication inputs. In particular, some aspects of the disclosure pertain to using vector computation to authenticate multi-factor authentication inputs.

BACKGROUND

The process of accessing secured information may involve the authentication of users. The authentication process may be based on the use of various types of inputs including passwords, personal identification numbers, and/ or or biometric inputs, that must be authenticated before access is granted. The process of authenticating users may involve balancing security and convenience interests. More secure forms of authentication may require significant amounts of computing resources, time, and/or specialized hardware. On the other hand, other forms of authentication may be more convenient, but at the expense of reduced security. As a result, implementing an authentication process may present challenges.

SUMMARY

Aspects of the disclosure provide technical solutions to improve the effectiveness of multi-factor authentication.

In accordance with one or more embodiments of the disclosure, a computing system for multi-factor authentication may comprise one or more processors; and memory storing computer-readable instructions that, when executed by the one or more processors, may cause the computing system to receive, from an authenticated entity, a plurality of authenticated inputs. The computing system may generate a plurality of normalized authenticated inputs. The computing system may generate, based on the plurality of normalized authenticated inputs, an n-dimensional authenticated signature vector. Each component of the n-dimensional authenticated signature vector may correspond to a normalized authenticated input. The computing system may receive a plurality of multi-factor authentication (MFA) inputs. The computing system may generate a plurality of normalized MFA inputs. The computing system may generate an n-dimensional MFA vector. Each component of the vector may correspond to a normalized MFA input. The computing system may determine whether a distance between the n-dimensional authenticated signature vector and the n-dimensional MFA vector is less than an authentication distance threshold. The computing system may, based on the distance between the n-dimensional authenticated signature vector and the n-dimensional MFA vector not exceeding the authentication distance threshold, generate an indication that the plurality of MFA inputs have been authenticated.

In one or more implementations, the plurality of MFA inputs may comprise at least two different types of inputs. At least one of the two different types of inputs may comprise a biometric input.

In one or more implementations, the plurality of MFA inputs correspond to a plurality of weights. Further, the plurality of weights may be positively correlated with contributing to determining a distance between the n-dimensional authenticated signature vector and the n-dimensional MFA vector.

In one or more implementations, the plurality of weights may be generated by one or more machine learning models that are configured to generate the plurality of weights based on input comprising the plurality of MFA inputs.

In one or more implementations, an authentication distance threshold may be generated by one or more machine learning models. Further, the computing system may access authentication training data comprising a plurality of historical MFA inputs and a plurality of historical authenticated multi-factor authentication (MFA) inputs. The computing system may generate, based on inputting the plurality historical MFA inputs and the plurality of historical authenticated inputs into the one or more machine learning models, a plurality of predicted authentication distance thresholds. The computing system may determine a similarity between the plurality of predicted authentication distance thresholds and a plurality of ground-truth authentication distance thresholds. The computing system may generate, based on the similarity between the plurality of predicted authentication distance thresholds and the plurality of ground-truth authentication distance thresholds, a distance threshold prediction accuracy of the one or more machine learning models. The computing system may adjust a weighting of one or more authentication distance threshold prediction parameters of the machine learning model based on the distance threshold prediction accuracy. The weighting of the authentication distance threshold prediction parameters that increase the distance threshold prediction accuracy may be increased. The weighting of the authentication distance threshold prediction parameters that decrease the distance threshold prediction accuracy may be decreased.

In one or more implementations, the plurality of multi-factor authentication inputs may comprise an image of a fingerprint. The memory stores computer-readable instructions to determine whether a distance between the n-dimensional authenticated signature vector and the n-dimensional MFA vector is less than an authentication distance threshold that, when executed by the one or more processors, may cause the computing system to determine a plurality of fingerprint patterns of the fingerprint. The computing system may determine a similarity between the plurality of fingerprint patterns and a plurality of authenticated fingerprint patterns. The computing system may determine the distance based on a similarity between the plurality of fingerprint patterns and the plurality of authenticated fingerprint patterns.

In one or more implementations, the similarity is based on a number of the plurality of fingerprint patterns that match the plurality of authenticated fingerprint patterns.

In one or more implementations, the plurality of multi-factor authentication inputs may comprise an image of an eye. The memory stores computer-readable instructions to determine whether a distance between the n-dimensional authenticated signature vector and the n-dimensional MFA vector is less than an authentication distance threshold that, when executed by the one or more processors, may cause the computing system to: determine a plurality of eye patterns of the eye. The computing system may determine a similarity between the plurality of eye patterns and a plurality of authenticated eye patterns. The computing system may determine the distance based on a similarity between the plurality of eye patterns and the plurality of authenticated eye patterns.

In one or more implementations, the similarity is based on a number of the plurality of eye patterns that match the plurality of authenticated eye patterns.

In one or more implementations, the plurality of multi-factor authentication inputs may comprise voice data. The memory stores computer-readable instructions to determine whether a distance between the n-dimensional authenticated signature vector and the n-dimensional MFA vector is less than an authentication distance threshold that, when executed by the one or more processors, may cause the computing system to: determine a plurality of vocal patterns of the voice data. The computing system may determine a similarity between the plurality of vocal patterns and a plurality of authenticated vocal patterns. The computing system may determine the distance based on a similarity between the plurality of vocal patterns and the plurality of authenticated vocal patterns.

In one or more implementations, the similarity is based on a number of the plurality of vocal patterns that match the plurality of authenticated vocal patterns.

In one or more implementations, the plurality of multi-factor authentication inputs may comprise an image of a face. Further, the memory may store computer-readable instructions to determine whether a distance between the n-dimensional authenticated signature vector and the n-dimensional MFA vector is less than an authentication distance threshold that, when executed by the one or more processors, may cause the computing system to: determine a plurality of visual features of the image of the face. The computing system may determine a similarity between the plurality of visual features and a plurality of authenticated visual features. The computing system may determine the distance based on the similarity between the plurality of visual features and the plurality of authenticated visual features.

In one or more implementations, the similarity is based on a number of the plurality of visual features that match the plurality of authenticated visual features.

In one or more implementations, the plurality of MFA inputs may comprise one or more biometric inputs, one or more text inputs, one or more integer inputs, or one or more floating point numerical inputs.

In one or more implementations, the one or more biometric inputs may comprise one or more fingerprint images, one or more iris images, one or more voice audio recordings, or one or more facial images.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
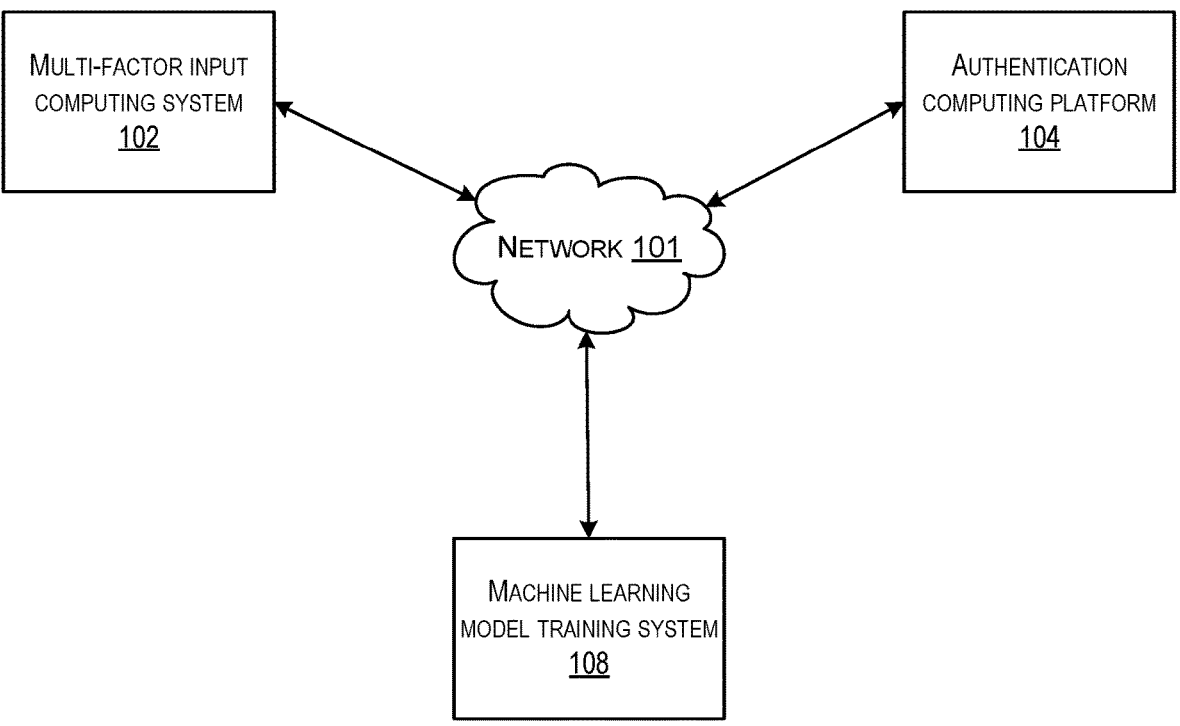
FIG. 1 depicts an illustrative computing environment for automatic multi-factor authentication in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, computer readable media (e.g., non-transitory computer readable media), and/or methods for multi-factor authentication that may be performed using vector computation. Multi-factor authentication may be used to improve security by using multiple inputs, each of which may be required to be authenticated in order to gain access to a secured space. Additionally, the disclosed technology may leverage the use of vector computation to determine whether to authenticate multi-factor authentication inputs.

Multi-factor authentication may include the use of multiple inputs, which may include inputs of the same type (e.g., multiple passwords) and/or inputs of different types (e.g., a biometric input and a password). The use of multiple inputs may improve security but may also carry an increased probability that multiple authentic inputs may not be authenticated due to minor discrepancies between the authentication inputs that are provided and the authenticated signature inputs to which the multiple authentic inputs are compared. The disclosed technology may use vector computation to compare a multi-factor authentication vector based on multi-factor authentication inputs to an n-dimensional authenticated signature vector based on authenticated inputs in order to determine whether the multi-factor authentication inputs should be authenticated.

In particular, a computing system may receive, from an authenticated entity, authenticated inputs. For example, a user (e.g., a user whose identity has been authenticated and who is authorized to create an authenticated input) of a computing device (e.g., a smartphone) may comprise a fingerprint reader and a keyboard (e.g., an onscreen touch sensitive keyboard generated within a user interface of the computing device). The user may then provide their fingerprint as an input to the fingerprint reader and a password as input to the keyboard. The computing system may then generate normalized authenticated inputs that may be used to generate an n-dimensional authenticated signature vector.

For example, the fingerprint and the password may be normalized into confidence values that may be used to determine a probability that a multi-factor authentication input is from the same source input (e.g., the same fingerprint or the same password) as the n-dimensional authenticated signature vector. An n-dimensional authenticated signature vector may then be generated based on the normalized authenticated inputs. The n-dimensional authenticated signature vector may then be used to authenticate multi-factor authentication inputs.

Further, the computing system may receive multi-factor authentication (MFA) inputs. For example, a user may enter MFA inputs comprising a fingerprint and a password via a computing device (e.g., a smartphone). The computing system may generate a plurality of normalized MFA inputs similarly to the way in which the authenticated normalized inputs were generated. The computing system may then generate an n-dimensional MFA vector that may be compared to the n-dimensional authenticated signature vector. Each component of the vector may correspond to a normalized MFA input. For example, if the normalized MFA inputs correspond to a fingerprint and password, then a two-dimensional MFA vector corresponding to the normalized fingerprint and password inputs may be generated. The normalized authenticated inputs and the normalized MFA inputs may be weighted. For example, a biometric input (e.g., a fingerprint or retinal scan input) may be weighted more heavily than password so that the biometric input may contribute more to the normalized authenticated inputs and normalized MFA inputs than the password.

The computing system may determine whether a distance between the n-dimensional authenticated signature vector and the n-dimensional MFA vector exceeds an authentication distance threshold. For example, the computing system may compare the n-dimensional authenticated signature vector to the n-dimensional MFA vector in order to determine the distance between the n-dimensional authenticated signature vector to the n-dimensional MFA vector. The computing system may, based on the distance between the n-dimensional authenticated signature vector and the n-dimensional MFA vector not exceeding the authentication distance threshold, generate an indication that the plurality of MFA inputs have been authenticated. For example, if the distance between the n-dimensional authenticated signature vector and the n-dimensional MFA vector is less than the authentication distance threshold, the computing system may generate an indication that the MFA inputs are authentic. Further, the computing system may grant access to some secured space (e.g., a secured application and/or file) based on the MFA inputs being determined to be authentic.

The use of the techniques described herein may result in a variety of technical effects, benefits, and advantages including improving the security, effectiveness, and efficiency with which multi-factor authentication inputs are authenticated. Further, the disclosed technology may result in more efficient use of computational resources by reducing the incidence of false negative authentication.

FIG. 1 depicts an illustrative computing environment for automatic multi-factor authentication in accordance with one or more aspects of the disclosure. Referring to FIG. 1, computing environment 100 may include one or more computing systems. For example, computing environment 100 may include multi-factor input computing system 102, authentication computing platform 104, and/or machine learning model training system 108.

As described further below, multi-factor input computing system 102 may comprise a computing system that includes one or more computing devices (e.g., computing devices comprising one or more processors, one or more memory devices, one or more storage devices, and/or communication interfaces) that may be used to authenticate multi-factor authentication inputs. For example, the multi-factor input computing system 102 may be configured to implement one or more machine learning models that may be configured and/or trained to authenticate inputs that may comprise multi-factor authentication inputs.

In some implementations, the multi-factor input computing system 102 may transmit data (e.g., a request to authenticate an input) that may be used to access information (e.g., an n-dimensional authenticated signature vector) associated with the authentication computing platform 104, and/or the machine learning model training system 108. The data transmitted by the multi-factor input computing system 102 may be transmitted to authentication computing platform 104, and/or machine learning model training system 108. Authentication computing platform 104 may be configured to grant access to the multi-factor input computing system 102. Authorization to access n-dimensional authenticated signature vectors stored on the authentication computing platform 104 may be restricted to authorized users of the multi-factor input computing system 102 and/or the authentication computing platform 104 (e.g., an administrator with permission to access an n-dimensional authenticated signature vector stored on authentication computing platform 104).

Communication between the multi-factor input computing system 102, authentication computing platform 104, and/or the machine learning model training system 108 may be encrypted. In some embodiments, the multi-factor input computing system 102 may access one or more computing devices and/or computing systems remotely. For example, the multi-factor input computing system 102 may remotely access the authentication computing platform 104, and/or the machine learning model training system 108.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDs, and/or RAM), and/or a communication interface that may be used to send and/or receive data and/or perform operations including determining whether to grant access to an n-dimensional authenticated signature vector stored on authentication computing platform 104. For example, the multi-factor input computing system 102 may process a plurality of multi-factor authentication inputs by generating an n-dimensional vector, comparing the n-dimensional vector to an n-dimensional authenticated signature vector, and authenticating the multi-factor authentication inputs if the n-dimensional vector that are within an authentication distance threshold of the n-dimensional authenticated signature vector.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for the determination of whether a distance between an n-dimensional authenticated signature vector and an n-dimensional MFA vector is less than an authentication distance threshold. One or more machine learning models stored and/or trained on the machine learning model training system 108 may include the one or more machine learning models on the multi-factor input computing system 102. Further, the one or more machine learning models of the multi-factor input computing system 102 may be trained and/or updated by the machine learning model training system 108.

Authentication computing platform 104 may comprise one or more computing devices and/or one or more computing systems. Each of the one or more computing devices and/or one or more computing systems may comprise one or more processors, one or more memory devices, one or more storage devices, and/or a communication interface that may be used to send and/or receive data and/or perform operations including determining whether to authenticate multi-factor authentication inputs. For example, the authentication computing platform 104 may receive, from the multi-factor input computing system 102, a request to authenticate an input. The request may comprise input data that the authentication computing platform 104 may analyze and use to determine whether to authenticate the input. The input data may comprise a passcode, a personal identification number (PIN), and/or a biometric input. The input data may be homomorphically encrypted. Further, the multi-factor input computing system 102 and/or the authentication computing platform 104 may be configured to process the input data that has been homomorphically encrypted. For example, one or more machine learning models implemented on the multi-factor input computing system 102 may use homomorphically encrypted input data to authenticate the input data without deciphering the input data. In this way, the confidentiality of personal information that may be determined from the input data may be maintained.

Computing environment 100 may include one or more networks, which may interconnect the multi-factor input computing system 102, authentication computing platform 104, and/or machine learning model training system 108. For example, computing environment 100 may include a network 101 which may interconnect, e.g., multi-factor input computing system 102, authentication computing platform 104, machine learning model training system 108. In some instances, the network 101 may be a 5G data network, and/or other data network.

In one or more arrangements, multi-factor input computing system 102, authentication computing platform 104, and/or machine learning model training system 108 may comprise one or more computing devices capable of sending and/or receiving data (e.g., n-dimensional authenticated signature vector data) and processing the data accordingly. For example, multi-factor input computing system 102, authentication computing platform 104, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. Further, the multi-factor input computing system 102 and/or the authentication computing platform 104 may comprise one or more input devices that may be configured to receive multi-factor authentication inputs. For example, the multi-factor input computing system 102 and/or the authentication computing platform 104 may comprise one or more keyboards, a touch sensitive screen (e.g., a capacitive touch screen or resistive touch screen), one or more fingerprint readers, one or more eye scanners (e.g., a retinal scanner and/or iris scanner), one or more microphones (e.g., microphones that may detect speech), and/or one or more cameras (e.g., cameras that may capture an image of a face).

Further, any combination of multi-factor input computing system 102, authentication computing platform 104, and/or machine learning model training system 108 may, in some instances, be special-purpose computing devices configured to perform specific functions. For example, multi-factor input computing system 102 may comprise one or more application specific integrated circuits (ASICs) that are configured to generate an n-dimensional vector based on multi-factor authentication inputs, compare the n-dimensional vector to an n-dimensional authenticated signature vector, and authenticate the multi-factor authentication inputs if the n-dimensional vector is within an authentication distance threshold of the n-dimensional authenticated signature vector.

Figure 2:
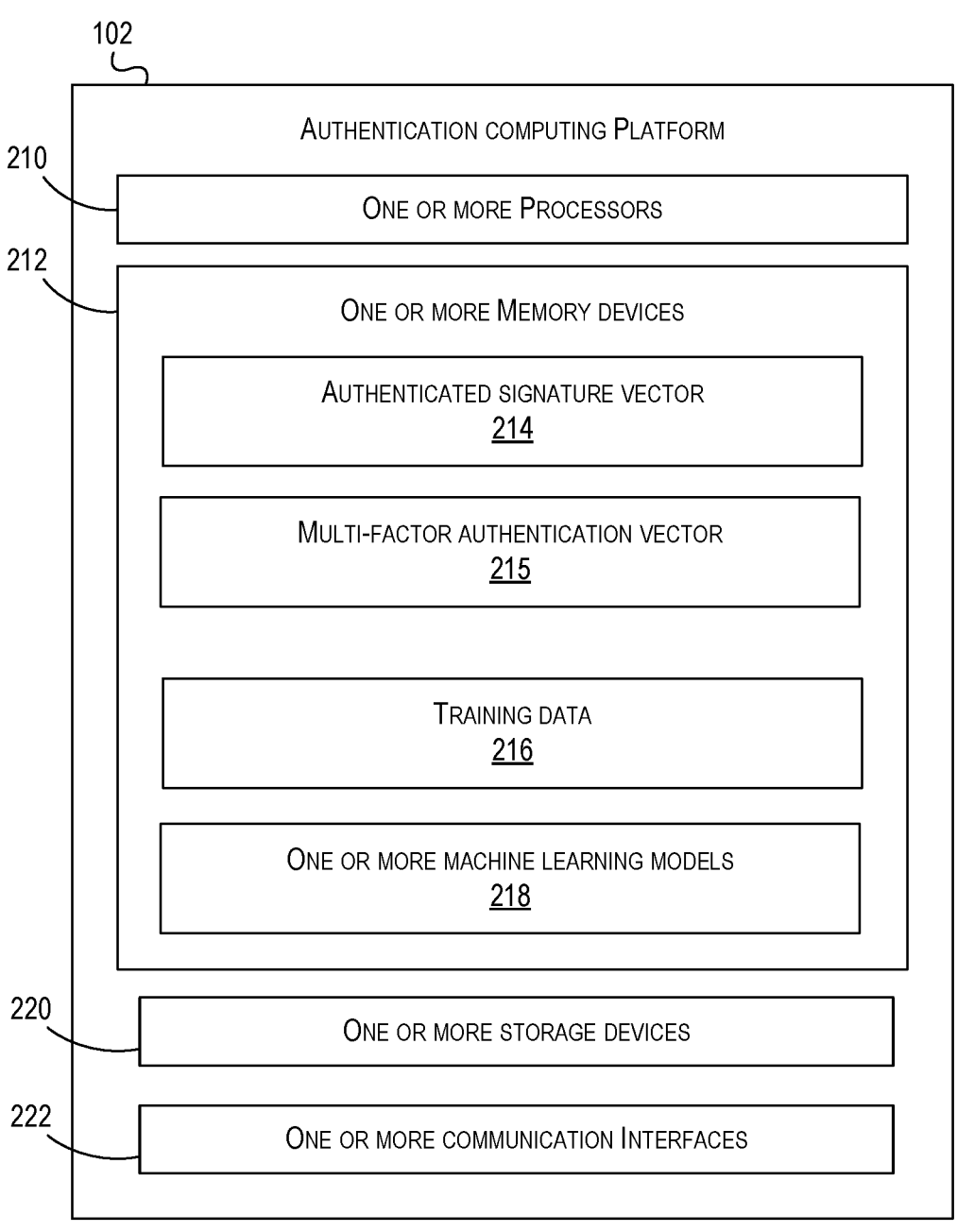
FIG. 2 depicts an illustrative computing system for automatic multi-factor authentication in accordance with one or more aspects of the disclosure.

FIG. 2 depicts an illustrative computing system for automatic multi-factor authentication in accordance with one or more aspects of the disclosure. Multi-factor input computing system 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between multi-factor input computing system 102 and one or more networks (e.g., network 101, or the like). One or more communication interfaces 222 may be communicatively coupled to the one or more processor 210. The memory may include one or more program modules having instructions that when executed by one or more processor 210 may cause the multi-factor input computing system 102 to perform one or more functions described herein and/or access data that may store and/or otherwise maintain information which may be used by such program modules and/or one or more processors 210.

The one or more memory devices 212 may comprise RAM. In some instances, the one or more program modules and/or databases may be stored by and/or maintained in different memory units of multi-factor input computing system 102 and/or by different computing devices that may form and/or otherwise make up multi-factor input computing system 102. For example, the memory may have, host, store, and/or include authenticated signature vector data 214, multi-factor authentication vector data 215, training data 216, and/or one or more machine learning models 218. One or more storage devices 220 (e.g., solid state drives and/or hard disk drives) may also be used to store data including the authenticated signature vector data 214, multi-factor authentication vector data 215, and/or training data 216. The one or more storage devices 220 may comprise non-transitory computer readable media that may store data when the one or more storage devices 220 are in an active state (e.g., powered on) or an inactive state (e.g., sleeping or powered off).

Authenticated signature vector data 214 may comprise data based on multi-factor authentication inputs that have been authenticated. For example, the authenticated signature vector data 214 may comprise vector data based on biometric inputs and/or password inputs that were previously authenticated and from which the authenticated signature vector was generated.

Multi-factor authentication vector data 215 may comprise data based on multi-factor authentication inputs that may be authenticated (e.g., multi-factor authentication inputs that have not yet been authenticated). For example, the multi-factor authentication vector data 215 may comprise vector data based on biometric inputs and/or password inputs that were provided and from which a multi-factor authentication vector was generated.

Training data 216 may comprise a plurality of historical MFA inputs and/or a plurality of historical authenticated inputs. Training data 216 may be used to train one or more machine learning models (e.g., machine learning models 218). Further, training data 216 may be modified (e.g., some historical data may be added, deleted, and/or changed) over time. For example, data comprising a plurality of new historical MFA inputs and/or a plurality of new historical authenticated multi-factor authentication inputs may be used to update the training data 216. Further, the training data may be periodically updated after a new plurality of historical MFA inputs and/or a plurality of historical authenticated inputs are received.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate training data 216. Further, the one or more machine learning models 218 may generate output including an indication of a distance between a multi-factor authentication vector and an authenticated signature vector and/or an indication of whether a distance between a multi-factor authentication vector and an authenticated signature vector exceeds an authentication distance threshold. Further, one or more machine learning models 218 may comprise one or more instructions that direct and/or cause the multi-factor input computing system 102 to authenticate multi-factor authentication vector data 215.

Figure 3:
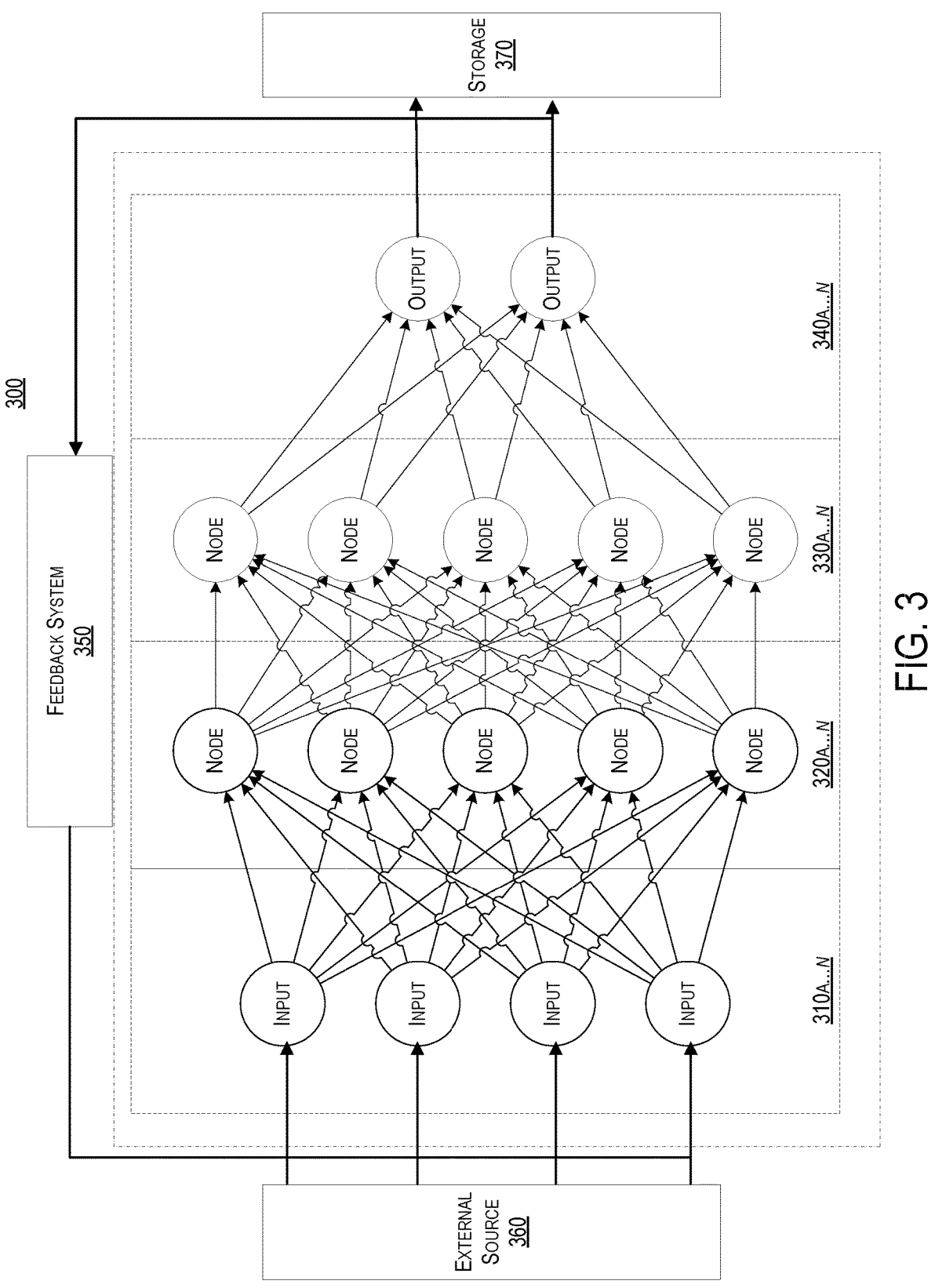
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include regression output, confidence values, and/or classification output. For example, the output may include an indication of whether a plurality of multi-factor authentication inputs have been authenticated. The system may use any machine learning model including one or more generative pretrained transformers (GPTs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize accuracy. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310a-n may comprise logical inputs of different data sources, such as one or more data servers. The processing nodes 320a-n may comprise parallel processes executing on multiple servers in a data center. And, the output nodes 340a-n may be the logical outputs that ultimately are stored in results data stores, such as the same or different data servers as for the input nodes 310a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to generate data (e.g., a plurality of normalized authenticated inputs, an authenticated vector signature, a plurality of normalized multi-factor authentication inputs, an n-dimensional multi-factor authentication vector, and/or an indication that a plurality of multi-factor authentication inputs have been authenticated) and/or instructions. The input nodes 310a-n may be provided with one or more prompts, a plurality of authenticated inputs and/or a plurality of multi-factor authentication inputs. The first set of processing nodes 320a-n may be each configured to perform specific steps to analyze the an authenticated vector signature and an n-dimensional multi-factor authentication vector in order to determine a distance between the authenticated vector signature and an n-dimensional multi-factor authentication vector. The second set of processing nodes 330a-n may be each configured to determine whether the distance between the authenticated vector signature and the n-dimensional multi-factor authentication vector is less than an authentication distance threshold. Multiple subsequent sets may further refine this processing, each looking for further more specific tasks, with each node performing some form of processing which need not necessarily operate in the furtherance of that task. The artificial neural network 300 may then execute or cause to be executed operations that generate indications of whether a plurality of multi-factor authentication inputs are authentic.

The feedback system 350 may be configured to determine the accuracy of the artificial neural network 300. Feedback may comprise an indication of similarity between the value of an output generated by the artificial neural network 300 and a ground-truth value. For example, in the multi-factor authentication example provided above, the feedback system 350 may be configured to determine the plurality of multi-factor authentication inputs that are within an authentication distance threshold.

The feedback system 350 may already have access to the ground-truth data (e.g., an authenticated multi-factor authentication input), such that the feedback system may train the artificial neural network 300 by indicating the accuracy of the output generated by the artificial neural network 300. The feedback system 350 may comprise human input, such as an administrator indicating to the artificial neural network 300 whether it made a correct decision. The feedback system may provide feedback (e.g., an indication of whether the previous output was correct or incorrect and/or an extent to which predicted distances between an authenticated vector signature and an n-dimensional multi-factor authentication vector are similar to ground-truth distances) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and/or validate authenticated input data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process authenticated input data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning. In some implementations, the artificial neural network 300 may receive input including one or more input features. The one or more input features may comprise information associated with a number and/or type of multi-factor authentication inputs.

Figure 4:
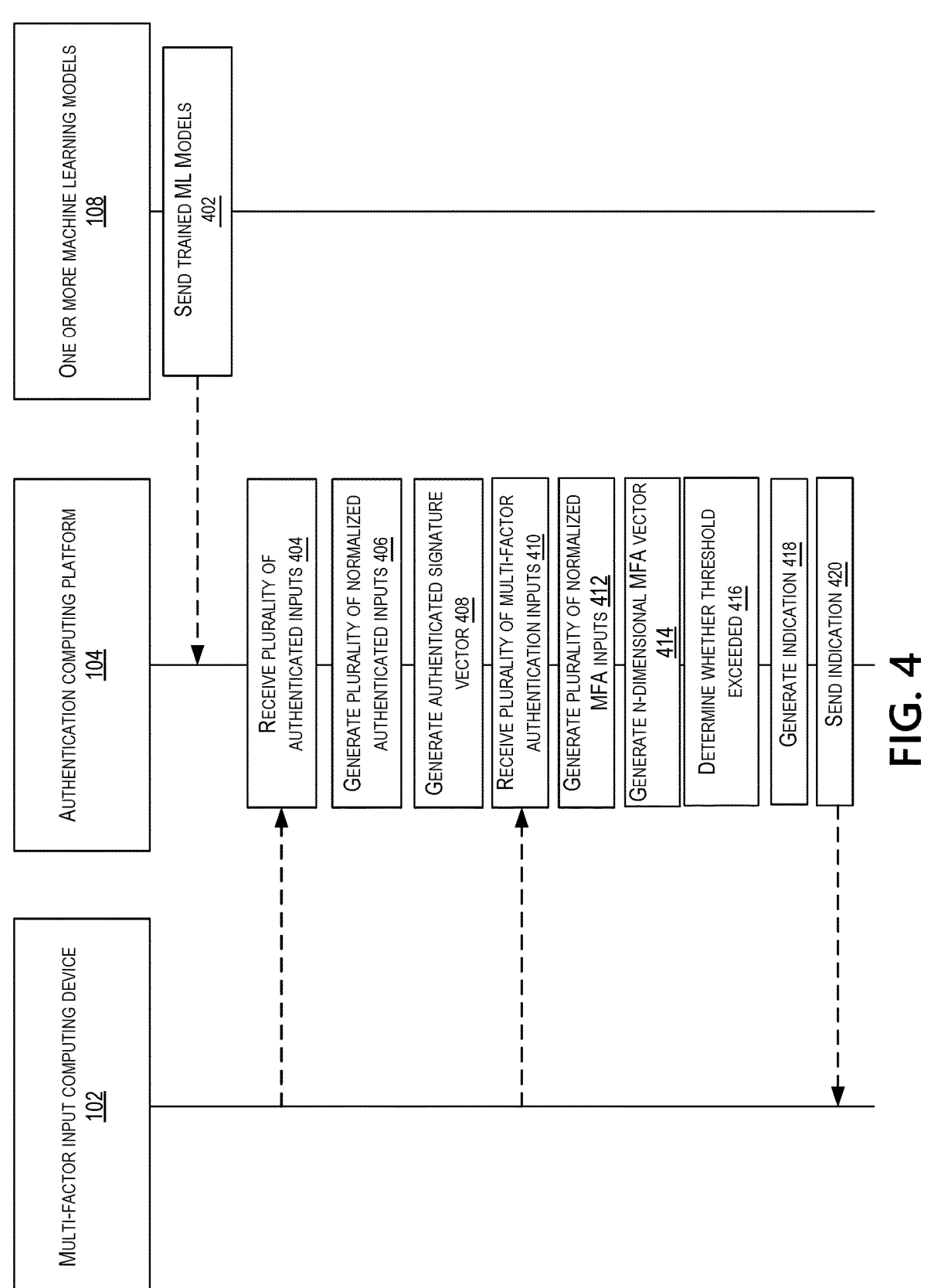
FIG. 4 depicts an illustrative event sequence for automatic multi-factor authentication in accordance with one or more aspects of the disclosure.

FIG. 4 depicts an illustrative event sequence for automatic multi-factor authentication in accordance with one or more aspects of the disclosure. Referring to FIG. 4, at step 402, a machine learning model training system 108 may train one or more machine learning models (e.g., the one or more machine learning models 218 that are described with respect to FIG. 2) to generate weightings of a plurality of MFA inputs and/or an authentication distance threshold. The machine learning model training system may then send the one or more trained machine learning models to multi-factor input computing system 102 which may implement the one or more trained machine learning models.

In some embodiments, multi-factor input computing system 102 may periodically establish a data connection with the machine learning model training system 108 in order to receive copies of one or more machine learning models (e.g., the one or more machine learning models 218 that are described with respect to FIG. 2 and/or the artificial neural network 300 that is described with respect to FIG. 3) that may be used to determine an authentication distance threshold and/or a plurality of weights of MFA inputs as described herein. In some instances, the machine learning model training system 108 may determine whether the multi-factor input computing system 102 has an up to date copy of the one or more machine learning models and may send an indication to the multi-factor input computing system 102 if an update is warranted.

At step 404, the authentication computing platform 104 may receive, from an authenticated entity (e.g., an authenticated user who is authorized to provide a plurality of authenticated inputs), a plurality of authenticated inputs. For example, the plurality of authenticated inputs may comprise an authenticated fingerprint and an authenticated password received from an authenticated entity (e.g., an authenticated user whose identify was authorized before providing the plurality of authenticated inputs). Authentication computing platform 104 may be configured to store, generate, send, and/or receive a plurality of authenticated inputs and/or a plurality of n-dimensional authenticated signature vectors.

At step 406, the authentication computing platform 104 may generate a plurality of normalized authenticated inputs. For example, authentication computing platform 104 may generate a plurality of normalized authenticated inputs based on the authenticated fingerprint and authenticated password received in step 404.

At step 408, the authentication computing platform 104 may generate, based on the plurality of normalized authenticated inputs, an n-dimensional authenticated signature vector. Each component of the n-dimensional authenticated signature vector may correspond to one of the plurality of normalized authenticated inputs. For example, multi-factor input computing system 102 may generate a two-dimensional authenticated signature vector that comprises two components corresponding to the authenticated fingerprint and the authenticated password of step 406.

At step 410, the authentication computing platform 104 may receive a plurality of multi-factor authentication inputs. For example, authentication computing platform 104 may receive, via network 101, a plurality of multi-factor authentication inputs comprising a fingerprint via a fingerprint reader of the multi-factor input computing system 102 and a password via a keyboard (e.g., an onscreen keyboard) of the multi-factor input computing system 102.

At step 412, the authentication computing platform 104 may generate a plurality of normalized MFA inputs. For example, authentication computing platform 104 may generate a plurality of normalized MFA inputs based on the MFA inputs (e.g., fingerprint and password) received in step 410.

At step 414, the authentication computing platform 104 may generate an n-dimensional MFA vector in which each component of the vector corresponds to a normalized MFA input. For example, multi-factor input computing system 102 may generate a two-dimensional MFA vector that comprises two components corresponding to the MFA fingerprint and the MFA password of step 412.

At step 416, the authentication computing platform 104 may determine whether the distance between the n-dimensional authenticated signature vector and the n-dimensional MFA vector is less than an authentication distance threshold. For example, authentication computing platform 104 may receive the n-dimensional MFA vector from multi-factor input computing system 102 and determine the distance between the n-dimensional authenticated signature vector and the n-dimensional MFA vector based on comparing the n-dimensional authenticated signature vector to the n-dimensional MFA vector.

At step 418, authentication computing platform 104 may generate an indication that the plurality of MFA inputs have been authenticated to the multi-factor input computing system 102. Based on the plurality of MFA inputs being authenticated, authentication computing platform 104 may generate either an indication that the plurality of MFA inputs were authenticated or an indication that the plurality of MFA inputs were not indicated.

At step 422, authentication computing platform 104 may send the indication to the multi-factor input computing system 102. For example, authentication computing platform 104 may send the indication to the multi-factor input computing system 102 via network 101.

Figure 5:
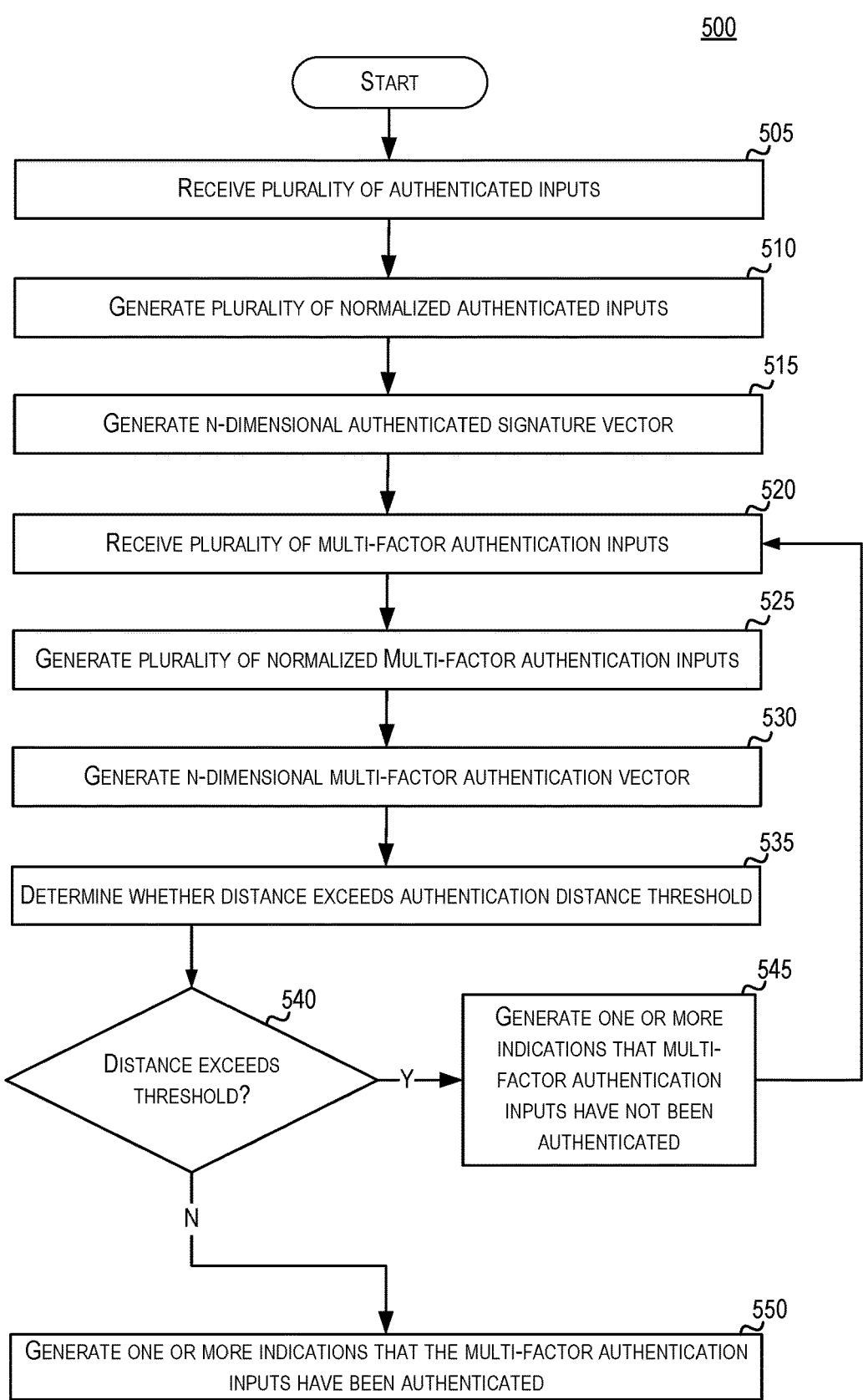
FIG. 5 depicts an illustrative method for automatic multi-factor authentication in accordance with one or more aspects of the disclosure.

FIG. 5 depicts an illustrative method for automatic multi-factor authentication in accordance with one or more aspects of the disclosure. The steps of a method 500 for automatic multi-factor authentication may be implemented by a computing device or computing system (e.g., the multi-factor input computing system 102) in accordance with the computing devices and/or computing systems described herein. One or more of the steps described with respect to FIG. 5 may be omitted, performed in a different order, and/or modified. Further, one or more other steps (e.g., the steps described with respect to FIG. 6) may be added to the steps described with respect to FIG. 5.

At step 505, a computing system may receive a plurality of authenticated inputs. For example, authentication computing platform 104 may receive the plurality of MFA inputs from multi-factor input computing system 102. The plurality of MFA inputs may comprise one or more biometric inputs, one or more alphanumeric inputs (e.g., inputs comprising one or more characters (e.g., letters, numbers, and/or symbols), one or more integer inputs, and/or one or more floating point numerical inputs). Further, the one or more biometric inputs may comprise one or more fingerprint images, one or more iris images, one or more retinal images, voice data (e.g., voice data comprising one or more recordings), and/or one or more facial images (e.g., two-dimensional images or three-dimensional images of a face and/or one or more portions of a face).

The plurality of authenticated inputs may be received from an authenticated entity. For example, the plurality of authenticated inputs may be received from a computing device that has authenticated the identify of a user that is authorized to provide an input (e.g., a password or biometric input) that may be used to generate an n-dimensional authenticated signature vector for use in authenticating multi-factor authentication inputs. For example, multi-factor input computing system 102 may be configured to receive a plurality of authenticated inputs when multi-factor input computing system 102 is executing a secure application (e.g., a secure banking application) that prompts an authenticated user to enter a plurality of inputs. The inputs received by multi-factor computing system may comprise a fingerprint input and a password input from an authenticated user (e.g., the user was authenticated in order to access the secure application and/or use the multi-factor input computing system 102).

The plurality of MFA inputs may comprise at least two different types of inputs. For example, the plurality of MFA inputs may comprise a retinal scan and a fingerprint. At least one of the two different types of inputs may comprise a biometric input. For example, the plurality of MFA inputs may comprise a password and a fingerprint.

At step 510, a computing system may generate a plurality of normalized authenticated inputs. For example, the authentication computing platform 104 may, via network 101 and from the multi-factor input computing system 102, receive a plurality of authenticated inputs comprising a password (e.g., the word "GOLDEN") and a fingerprint. The authentication computing platform 104 may generate a plurality of normalized authenticated inputs comprising normalized numerical values that are based on the plurality of authenticated inputs (e.g., two sixty-four bit numbers corresponding to the password and features of the fingerprint). Normalization of the plurality of authenticated inputs may comprise generating normalized authenticated input values for each of the plurality of authenticated inputs such that each of the normalized authenticated input values is within a predetermined range (e.g., a range from a minimum value to a maximum value) that is the same as the range for normalized values corresponding to the other plurality of authenticated inputs.

The plurality of normalized authenticated inputs may be weighted. For example, a normalized authenticated input based on a fingerprint may be more heavily weighted than a normalized authenticated input that is a password. The weighting of the normalized authenticated input may determine the extent to which the normalized authenticated input contributes to generating the n-dimensional authenticated signature vector.

At step 515, a computing system may generate an n-dimensional authenticated signature vector corresponding to the plurality of normalized authenticated inputs. Each component of the n-dimensional authenticated signature vector may correspond to a normalized authenticated input of the plurality of normalized authenticated inputs. For example, if there are two normalized authenticated inputs, the authentication computing platform 104 may generate a two-dimensional vector comprising two components corresponding to the two normalized authenticated inputs.

At step 520, a computing system may receive a plurality of multi-factor authentication (MFA) inputs. For example, the multi-factor input computing system 102 may comprise one or more input devices comprising a keyboard and a fingerprint reader. The authentication computing platform 104 may receive a plurality of MFA from multi-factor input computing system 102. The plurality of MFA inputs may comprise a password (e.g., the word "GOLDEN") inputted via a keyboard of the multi-factor input computing system 102 and a fingerprint inputted via a fingerprint reader of the multi-factor input computing system 102.

At step 525, a computing system may generate a plurality of normalized MFA inputs. For example, the authentication computing platform 104 may generate a plurality of numerical values that are based on the plurality of MFA inputs (e.g., two sixty-four bit numbers corresponding to a password and the fingerprint) received from the multi-factor input computing system 102. Normalization of the plurality of MFA inputs may comprise generating normalized MFA values for each of the plurality of MFA inputs such that each of the normalized MFA values is within a predetermined range (e.g., a range from a minimum value to a maximum value) that is the same as the range for normalized MFA values corresponding to the other plurality of MFA inputs.

At step 530, a computing system may generate an n-dimensional MFA vector corresponding to the plurality of normalized MFA inputs. Each component of the n-dimensional MFA vector may correspond to a normalized MFA input of the plurality of normalized MFA inputs. For example, if there are two normalized MFA inputs, the authentication computing platform 104 may generate a two-dimensional vector comprising two components corresponding to the two normalized MFA inputs.

At step 535, the computing system may determine whether a distance between the n-dimensional authenticated signature vector and the n-dimensional MFA vector is less than an authentication distance threshold. For example, the authentication computing platform 104 may compare the n-dimensional authenticated signature vector to the n-dimensional MFA vector in order to determine whether the distance between the n-dimensional authenticated signature vector and the n-dimensional MFA vector is less than an authentication distance threshold.

The plurality of MFA inputs may correspond to a plurality of weights. For example, each of an n-dimensional authenticated signature vector and an n-dimensional MFA vector may be three dimensional vectors comprising a fingerprint component that has a weight of fifty percent, a password component with a weight of twenty percent, and a facial scan component that has a weight of thirty percent. The distance between the n-dimensional authenticated signature vector and the n-dimensional MFA vector may be based on the plurality of weights. Further, the plurality of weights may be positively correlated with contributing to determining a distance between the n-dimensional authenticated signature vector and the n-dimensional MFA vector. An MFA input that is more heavily weighted may cause a greater change (e.g., in the distance between the n-dimensional authenticated signature vector and the n-dimensional MFA vector than an MFA input that is less heavily weighted.

For example, if an n-dimensional MFA vector comprises two MFA inputs, a first MFA input and a second MFA input that are equally weighted (e.g., a weighting of fifty percent for each of the MFA inputs), a difference between the first MFA input and a corresponding first component of the n-dimensional authenticated signature vector may result in the same distance between the n-dimensional MFA vector and the n-dimensional authenticated signature vector as the same relative difference between the second MFA input and a corresponding second component of the n-dimensional authenticated signature vector. By way of further example, if an n-dimensional MFA vector comprises two MFA inputs, a first MFA input and a second MFA input that are unequally weighted (e.g., an eighty percent weighting for the first MFA input and a twenty percent weighting for the second MFA input), a difference between the first MFA input and a corresponding first component of the n-dimensional authenticated signature vector may result in a greater change (e.g., a four times greater change) in distance between the n-dimensional MFA vector and the n-dimensional authenticated signature vector than the same relative difference between the second MFA input and a corresponding second component of the n-dimensional authenticated signature vector.

Further, biometric MFA inputs may be more heavily weighted than non-biometric MFA inputs. For example, when determining a distance between the n-dimensional authenticated signature vector and the n-dimensional MFA vector, differences between the n-dimensional authenticated signature vector's fingerprint component and the n-dimensional MFA vector's fingerprint component may contribute to a greater increase in the distance between the n-dimensional authenticated signature vector and the n-dimensional MFA vector than differences between the password or facial scan components of the n-dimensional authenticated signature vector and password or facial scan components of the n-dimensional MFA vector.

The plurality of weights may be generated by one or more machine learning models that are configured to generate the plurality of weights based on a plurality of historical MFA inputs and a plurality of historical authenticated inputs. For example, one or more machine learning models may be configured and/or trained to process a plurality of historical MFA inputs and/or a plurality of historical authenticated inputs. The one or more machine learning models may determine false rejection rates and/or false acceptance rates of different types of historical MFA inputs. Further, the one or more machine learning models may determine that the types of historical MFA inputs that have lower false rejection rates and/or lower false acceptance rates may be weighted more heavily than the types of historical MFA inputs that have higher false rejection rates and/or higher false acceptance rates.

The plurality of MFA inputs may comprise an image (e.g., a two-dimensional image or a three dimensional image) of a fingerprint or a portion of a fingerprint. For example, the image of a fingerprint may comprise an image of one or more fingers. One or more sensors (e.g., a camera, scanner, or other imaging device) may be used to capture an image of a fingerprint or a portion of a fingerprint. Further, determining whether a distance between the n-dimensional authenticated signature vector and the n-dimensional MFA vector is less than an authentication distance threshold may comprise determining a plurality of fingerprint patterns (e.g., loop patterns, whorl patterns, and/or arch patterns) of the fingerprint. For example, the locations, number, and shapes of fingerprint patterns may be determined.

A similarity between the plurality of fingerprint patterns and a plurality of authenticated fingerprint patterns may be determined. For example, a plurality of fingerprint pattern values may be generated based on the plurality of fingerprint patterns; and a plurality of authenticated fingerprint pattern values may be generated based on the plurality of authenticated fingerprint patterns. For example, a plurality of fingerprint pattern values and a plurality of authenticated fingerprint pattern values may comprise values corresponding to one or more visual features (e.g., loop patterns, whorl patterns, and/or arch patterns) of one or both fingerprints. The similarity between the plurality of fingerprint patterns and the plurality of authenticated fingerprint patterns may be determined based on one or more similarities (e.g., a number of the fingerprint pattern values that match and/or an extent to which the plurality of fingerprint patterns match) between the plurality of fingerprint pattern values and the plurality of authenticated fingerprint pattern values.

Further, the distance (e.g., the distance between the n-dimensional authenticated signature vector and the n-dimensional MFA vector) may be determined to be based on a similarity between the plurality of fingerprint patterns and the plurality of authenticated fingerprint patterns. For example, the n-dimensional authenticated signature vector may be generated based on normalized authenticated fingerprint pattern values that are based on the plurality of authenticated fingerprint patterns. Further, the n-dimensional MFA vector may be generated based on normalized fingerprint pattern values that are based on the plurality of fingerprint patterns. The distance may then be determined based on comparing the n-dimensional authenticated signature vector based on the plurality of authenticated fingerprint patterns to the n-dimensional MFA vector based on the plurality of fingerprint patterns.

The plurality of MFA inputs may comprise an image of an eye or a portion of an eye (e.g., an iris and/or retina). For example, the image of an eye may comprise an image of an iris and/or retina of the eye. One or more sensors (e.g., a camera, scanner, or other imaging device) may be used to capture an image of an eye or a portion of an eye. Further, determining whether a distance between the n-dimensional authenticated signature vector and the n-dimensional MFA vector is less than an authentication distance threshold may comprise determining a plurality of eye patterns (e.g., iris patterns and/or retinal patterns) of the eye. For example, patterns of a plurality of retinal vessels may be determined. By way of further example, patterns of a plurality of features (e.g., pigmented rings, crypts, and/or furrows) of one or both irises may be determined.

A similarity between the plurality of eye patterns and a plurality of authenticated eye patterns may be determined. For example, a plurality of eye pattern values may be generated based on the plurality of eye patterns; and a plurality of authenticated eye pattern values may be generated based on the plurality of authenticated eye patterns. For example, a plurality of eye pattern values and the plurality of authenticated eye pattern values may comprise values corresponding to one or more visual features (e.g., color, shape, detected edges, and/or dimensions) of one or both eyes. The similarity between the plurality of eye patterns and the plurality of authenticated eye patterns may be determined based on one or more similarities (e.g., a number of the eye pattern values that match and/or an extent to which the plurality of eye patterns match) between the plurality of eye pattern values and the plurality of authenticated eye pattern values.

Further, the distance (e.g., the distance between the n-dimensional authenticated signature vector and the n-dimensional MFA vector) may be determined to be based on a similarity between the plurality of eye patterns and the plurality of authenticated eye patterns. For example, the n-dimensional authenticated signature vector may be generated based on normalized authenticated eye pattern values that are based on the plurality of authenticated eye patterns. Further, the n-dimensional MFA vector may be generated based on normalized eye pattern values that are based on the plurality of eye patterns. The distance may then be determined based on comparing the n-dimensional authenticated signature vector based on the plurality of authenticated eye patterns to the n-dimensional MFA vector based on the plurality of eye patterns.

The plurality of MFA inputs may comprise voice data (e.g., an audio recording of a voice). For example, the voice data may comprise a recording of a human voice speaking a word or phrase. One or more sensors (e.g., one or more microphones) and an associated computing device may be used to detect and/or recognize a voice. Further, determining whether a distance between the n-dimensional authenticated signature vector and the n-dimensional MFA vector is less than an authentication distance threshold may comprise determining a plurality of vocal patterns (e.g., acoustic features of a voice which may include a vocal tone, articulation, pitch, rate, fluency, and/or enunciation) of the voice on which the voice data is based.

A similarity between the plurality of vocal patterns and a plurality of authenticated vocal patterns may be determined. For example, a plurality of vocal pattern values may be generated based on the plurality of vocal patterns; and a plurality of authenticated vocal pattern values may be generated based on the plurality of authenticated vocal patterns. For example, a plurality of vocal pattern values and a plurality of authenticated vocal pattern values may comprise values corresponding to one or more acoustic features (e.g., features of a voice which may include a vocal tone, articulation, pitch, rate, fluency, and/or enunciation) of a voice on which the voice data is based. The similarity between the plurality of vocal patterns and the plurality of authenticated vocal patterns may be determined based on one or more similarities (e.g., a number of the vocal pattern values that match and/or an extent to which the plurality of vocal patterns match) between the plurality of vocal pattern values and the plurality of authenticated vocal pattern values.

Further, the distance (e.g., the distance between the n-dimensional authenticated signature vector and the n-dimensional MFA vector) may be determined to be based on a similarity between the plurality of vocal patterns and the plurality of authenticated vocal patterns. For example, the n-dimensional authenticated signature vector may be generated based on normalized authenticated vocal pattern values that are based on the plurality of authenticated vocal patterns. Further, the n-dimensional MFA vector may be generated based on normalized vocal pattern values that are based on the plurality of vocal patterns. The distance may be determined based on comparing the n-dimensional authenticated signature vector based on the plurality of authenticated vocal patterns to the n-dimensional MFA vector based on the plurality of vocal patterns.

The plurality of MFA inputs may comprise an image (e.g., a two-dimensional image or a three dimensional image) of a face or a portion of a face. For example, an image of a face may comprise an image of the front of a head or a portion of a face (e.g., the eyes, nose, and mouth of a face). The image of the face or a portion of the face may be captured by one or more sensors (e.g., a camera, scanner, or other imaging device). Further, determining whether a distance between the n-dimensional authenticated signature vector and the n-dimensional MFA vector is less than an authentication distance threshold may comprise determining a plurality of visual features of the face. For example, a three-dimensional depth map of a face may be generated and visual features of the face (e.g., geometric relations between different features of a face) may be determined based on the depth map.

A similarity between the plurality of visual features and a plurality of authenticated visual features may be determined. For example, a plurality of visual feature values may be generated based on the plurality of visual features of a face; and a plurality of authenticated visual features values may be generated based on the plurality of authenticated visual features of a face. For example, a plurality of visual feature values and a plurality of authenticated visual features values may comprise values corresponding to one or more visual features (e.g., loop patterns, whorl patterns, and/or arch patterns) of a face or a portion of a face. The similarity between the plurality of visual features and the plurality of authenticated visual features may be determined based on one or more similarities (e.g., a number of the visual features values that match and/or an extent to which the plurality of visual features match) between the plurality of visual feature values and the plurality of authenticated visual features values.

Further, the distance (e.g., the distance between the n-dimensional authenticated signature vector and the n-dimensional MFA vector) may be determined to be based on a similarity between the plurality of visual features and the plurality of authenticated visual features. For example, the n-dimensional authenticated signature vector may be generated based on normalized authenticated visual features values that are based on the plurality of authenticated visual features. Further, the n-dimensional MFA vector may be generated based on normalized visual features values that are based on the plurality of visual features. The distance may then be determined based on comparing the n-dimensional authenticated signature vector based on the plurality of authenticated visual features to the n-dimensional MFA vector based on the plurality of visual features.

At step 540, the computing system may, based on the distance between the n-dimensional authenticated signature vector and the n-dimensional MFA vector not exceeding the authentication distance threshold (e.g., the distance being less than or equal to the authentication distance threshold), perform step 550. For example, a computing system (e.g., the authentication computing platform 104) may, based on evaluating and/or comparing the n-dimensional authenticated signature vector to the n-dimensional MFA vector, determine that a distance between the n-dimensional authenticated signature vector and the n-dimensional MFA vector is less than an authentication distance threshold.

Based on the distance between the n-dimensional authenticated signature vector and the n-dimensional MFA vector exceeding the authentication distance threshold, the computing system may perform step 545. For example, a computing system (e.g., the multi-factor input computing system 102) may, based on evaluating and/or comparing the n-dimensional authenticated signature vector to the n-dimensional MFA vector, determine that a distance between the n-dimensional authenticated signature vector and the n-dimensional MFA vector is greater than or equal to an authentication distance threshold.

At step 545, a computing system may generate one or more indications (e.g., a message) that the plurality of MFA inputs have not been authenticated. The one or more indications may indicate that the plurality of MFA inputs were not authenticated. For example, the one or more indications may comprise an indication that authorization for access to a secured space (e.g., a secure file, secure website such as a banking website, and/or a secure application) was denied. Receiving a predetermined number of indications that the MFA inputs were not authenticated may result in a temporary or permanent blockage of access to the secure space.

Further, the one or more indications may comprise a message. For example, the, based on evaluating the n-dimensional authenticated signature vector and the n-dimensional MFA vector, may generate a message indicating "MULTI-FACTOR AUTHENTICATION INPUTS NOT AUTHENTICATED." The one or more indications may be sent to a computing device (e.g., a computing device that received the plurality of multi-factor authentication inputs). For example, the one or more indications may be sent to the multi-factor input computing system 102 and may be displayed on a display device of the multi-factor input computing system 102. In some embodiments, the computing system may perform step 520 after completing step 545.

At step 550, a computing system may generate one or more indications (e.g., a message) that the plurality of MFA inputs have been authenticated. The one or more indications may cause the authentication of the plurality of MFA inputs. For example, the one or more indications may comprise an authorization for access to a secured space (e.g., a secure file, secure website such as a banking website, and/or a secure application). When the one or more indications are received by the computing device through which the secured space may be accessed, access to the secured space may be granted.

Further, the one or more indications may comprise a message. For example, the multi-factor input computing system 102 may generate a message indicating "MULTI-FACTOR AUTHENTICATION INPUTS AUTHENTICATED." The one or more indications may be sent to a computing device (e.g., a computing device that received the plurality of multi-factor authentication inputs). For example, the one or more indications may be sent to the multi-factor input computing system 102 and may be displayed on a display device of the multi-factor input computing system 102. In some embodiments, the computing system may perform step 520 after completing performance of step 550.

Figure 6:
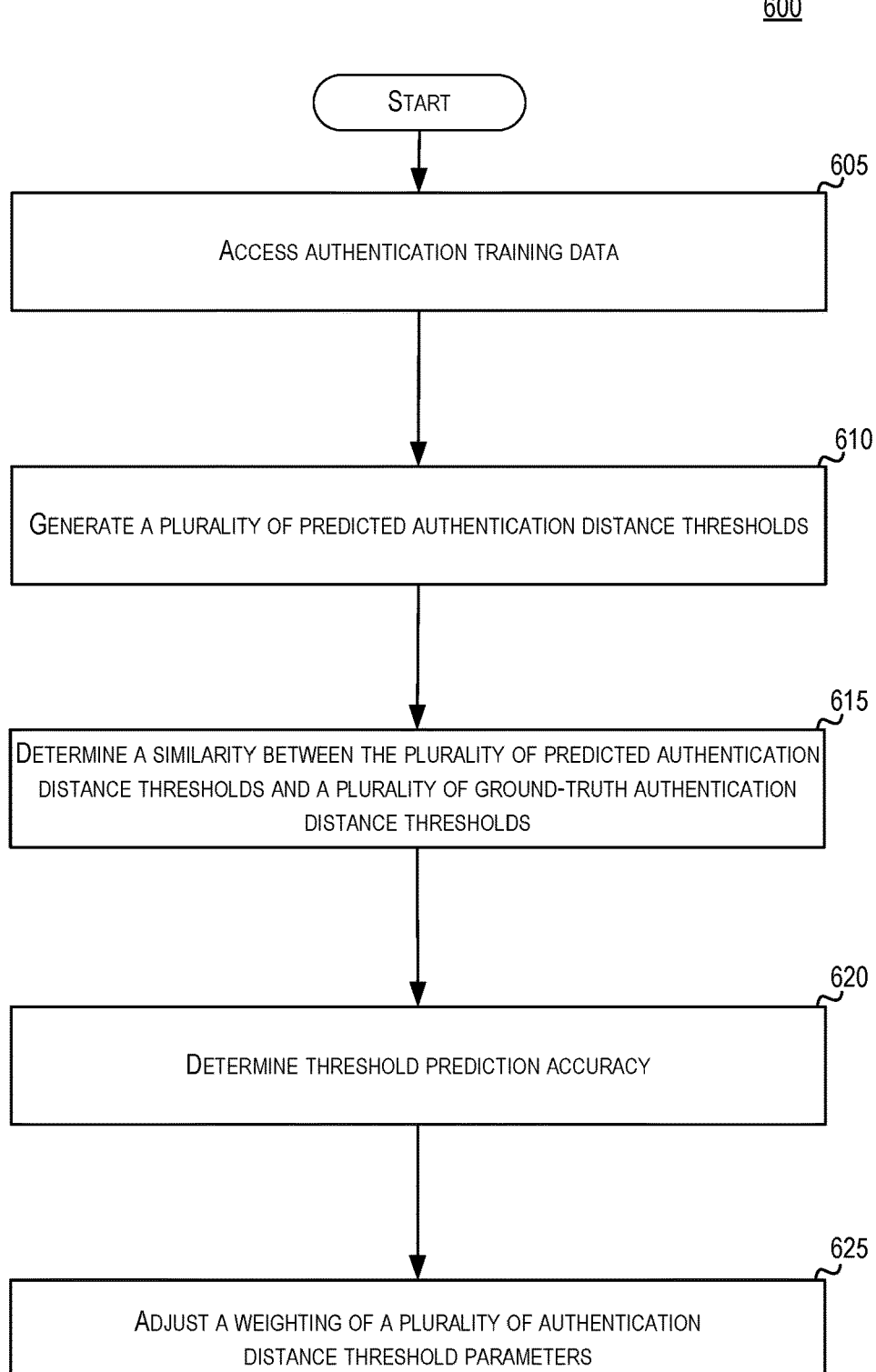
FIG. 6 depicts an illustrative method for automatically training a machine learning model to generate authentication distance thresholds in accordance with one or more aspects of the disclosure.

FIG. 6 depicts an illustrative method for automatically training a machine learning model to generate authentication distance thresholds in accordance with one or more aspects of the disclosure. The steps of a method 600 for automatically training a machine learning model to automatically predict multi-factor authentication distances may be implemented by a computing device or computing system (e.g., the multi-factor input computing system 102) in accordance with the computing devices and/or computing systems described herein. One or more of the steps described with respect to FIG. 6 may be omitted, performed in a different order, and/or modified. Further, one or more other steps (e.g., the steps described with respect to FIG. 6) may be added to the steps described with respect to FIG. 5.

At step 605, a computing system may access authentication training data. The authentication training data may comprise a plurality of historical MFA inputs and/or a plurality of historical authenticated inputs. Further, the plurality of historical MFA inputs and/or the plurality of historical authenticated inputs may be weighted. For example, the plurality of historical MFA inputs and/or the plurality of historical authenticated inputs may be weighted such that some of the plurality of historical MFA inputs and/or the plurality of historical authenticated inputs are more heavily weighted than others. Further, the weighting of the plurality of historical MFA inputs may determine the historical MFA vector that is generated based on the plurality of historical MFA inputs. The weighting of the plurality of historical authenticated inputs may determine the historical authenticated signature vector that is generated based on the plurality of historical authenticated inputs. Further, some of the plurality of authentication distance threshold prediction parameters may be more heavily weighted than other authentication distance threshold prediction parameters. For example, historical MFA biometric inputs may be weighted more heavily than historical MFA alphanumeric inputs.

Each of the plurality of historical MFA inputs and the plurality of historical authenticated inputs may be based on existing real-world inputs that were previously used as part of an authentication process. The authentication training data may be similar to the authenticated input data described herein and may comprise authenticated input data from existing multi-factor authentication inputs. The authentication training data may be stored in a storage device of the machine learning model training system 108 and/or a remote storage system, and may be accessed by the machine learning model training system 108 in order to train and/or retrain the one or more machine learning models.

At step 610, a computing system may generate a plurality of predicted authentication distance thresholds. The plurality of predicted authentication distance threshold may comprise distances between a plurality of historical authenticated signature vectors based on the plurality of historical MFA inputs and a plurality of historical MFA vectors based on the plurality of historical authenticated inputs. Further, the plurality of historical MFA inputs and/or the plurality of historical authenticated inputs may be normalized. Further, the one or more machine learning models may generate a plurality of predicted authentication distance thresholds based on different weightings of the plurality of historical MFA inputs and/or the plurality of historical authenticated inputs.

Generating the plurality of predicted authentication distance thresholds may be based on inputting the authentication training data into the one or more machine learning models. The one or more machine learning models may comprise the features and/or capabilities of machine learning models described herein including the one or more machine learning models 218 described with respect to FIG. 2 and/or the artificial neural network 300 described with respect to FIG. 3. For example, authentication training data may be inputted into one or more machine learning models that are implemented on the machine learning model training system 108.

The one or more machine learning models may be configured and/or trained by the machine learning model training system 108. Further, the one or more machine learning models may be configured and/or trained to receive the authentication training data and perform one or more operations including analyzing the plurality of historical MFA inputs and/or the plurality of historical authenticated inputs.

At step 615, a computing system may determine similarities between the plurality of predicted authentication distance thresholds and a plurality of ground-truth authentication distance thresholds. Determining similarities between the plurality of predicted authentication distance thresholds and the plurality of ground-truth authentication distance thresholds may be based on one or more evaluations and/or one or more comparisons of the plurality of predicted authentication distance thresholds to the plurality of ground-truth authentication distance thresholds.

At step 620, a computing system may generate, based on the similarity between the plurality of predicted authentication distance thresholds and the plurality of ground-truth authentication distance thresholds, a distance threshold prediction accuracy of the one or more machine learning models. Generation of the distance threshold prediction accuracy may be based on an extent to which the plurality of predicted authentication distance thresholds are similar to the plurality of ground-truth authentication distance thresholds.

For example, if the plurality of predicted authentication distance thresholds and the plurality of ground-truth authentication distance thresholds are within a threshold range of similarity then the similarity may be determined to be high. If the plurality of predicted authentication distance thresholds and the plurality of ground-truth authentication distance thresholds are dissimilar are outside a threshold range of similarity, the similarity may be determined to be low. The distance threshold prediction accuracy may be positively correlated with the similarity between the plurality of predicted authentication distance thresholds and the plurality of ground-truth authentication distance thresholds. Further, the distance threshold prediction accuracy may be based on an amount of similarities comprising an amount of the plurality of predicted authentication distance thresholds that are within a threshold similarity of the plurality of ground-truth authentication distance thresholds.

At step 625, a computing system may adjust a weighting of a plurality of authentication distance threshold prediction parameters of the one or more machine learning models based on the distance threshold prediction accuracy. For example, the machine learning model training system 108 may increase the weight of the plurality of authentication distance threshold prediction parameters that were determined to increase the distance threshold prediction accuracy and/or decrease the weight of the plurality of authentication distance threshold prediction parameters that were determined to decrease the distance threshold prediction accuracy.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air and/or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for multi-factor authentication (MFA), the computing system comprising:
   one or more processors; and
   memory storing computer-readable instructions that, when executed by the one or more processors, cause the computing system to:
   receive, from an authenticated entity, a plurality of authenticated inputs;
   generate a plurality of normalized authenticated inputs;
   generate an n-dimensional authenticated signature vector corresponding to the plurality of normalized authenticated inputs;
   receive a plurality of MFA inputs;
   generate a plurality of normalized MFA inputs;
   generate an n-dimensional MFA vector corresponding to the normalized MFA inputs;
   determine whether a distance between the n-dimensional authenticated signature vector and the n-dimensional MFA vector is less than an authentication distance threshold; and
   based on the distance between the n-dimensional authenticated signature vector and the n-dimensional MFA vector not exceeding the authentication distance threshold, generate an indication that the plurality of MFA inputs have been authenticated.

2. The computing system of claim 1, wherein the plurality of MFA inputs comprise at least two different types of inputs, and wherein at least one of the two different types of inputs comprises a biometric input.

3. The computing system of claim 1, wherein the plurality of MFA inputs correspond to a plurality of weights, and wherein the distance between the n-dimensional authenticated signature vector and the n-dimensional MFA vector is based on the plurality of weights.

4. The computing system of claim 3, wherein the plurality of weights are generated by one or more machine learning models that are configured to generate the plurality of weights based on a plurality of historical MFA inputs and a plurality of historical authenticated MFA inputs.

5. The computing system of claim 1, wherein the authentication distance threshold is generated by one or more machine learning models, and wherein the memory stores computer-readable instructions, that when executed by the one or more processors, cause the computing system to:

access authentication training data comprising a plurality of historical MFA inputs and a plurality of historical authenticated inputs;

generate, based on inputting the plurality of historical MFA inputs and the plurality of historical authenticated inputs into the one or more machine learning models, a plurality of predicted authentication distance thresholds;

determine a similarity between the plurality of predicted authentication distance thresholds and a plurality of ground-truth authentication distance thresholds;

generate, based on the similarity between the plurality of predicted authentication distance thresholds and the plurality of ground-truth authentication distance thresholds, a distance threshold prediction accuracy of the one or more machine learning models; and adjust a weighting of one or more authentication distance threshold prediction parameters of the machine learning models based on the distance threshold prediction accuracy, wherein the weighting of the one or more authentication distance threshold prediction parameters that increase the distance threshold prediction accuracy is increased, and wherein the weighting of the one or more authentication distance threshold prediction parameters that decrease the distance threshold prediction accuracy is decreased.

6. The computing system of claim 1, wherein the plurality of MFA inputs comprise an image of a fingerprint, and wherein the memory stores computer-readable instructions to determine whether a distance between the n-dimensional authenticated signature vector and the n-dimensional MFA vector is less than an authentication distance threshold that, when executed by the one or more processors, cause the computing system to:

determine a plurality of fingerprint patterns of the fingerprint;

determine a similarity between the plurality of fingerprint patterns and a plurality of authenticated fingerprint patterns; and determine the distance based on a similarity between the plurality of fingerprint patterns and the plurality of authenticated fingerprint patterns.

7. The computing system of claim 6, wherein the similarity is based on a number of the plurality of fingerprint patterns that match the plurality of authenticated fingerprint patterns.

8. The computing system of claim 1, wherein the plurality of MFA inputs comprise an image of an eye, and wherein the memory stores computer-readable instructions to determine whether a distance between the n-dimensional authenticated signature vector and the n-dimensional MFA vector is less than an authentication distance threshold that, when executed by the one or more processors, cause the computing system to:

determine a plurality of eye patterns of the eye;

determine a similarity between the plurality of eye patterns and a plurality of authenticated eye patterns; and determine the distance based on a similarity between the plurality of eye patterns and the plurality of authenticated eye patterns.

9. The computing system of claim 8, wherein the similarity is based on a number of the plurality of eye patterns that match the plurality of authenticated eye patterns.

10. The computing system of claim 1, wherein the plurality of MFA inputs comprise voice data, and wherein the memory stores computer-readable instructions to determine whether a distance between the n-dimensional authenticated signature vector and the n-dimensional MFA vector is less than an authentication distance threshold that, when executed by the one or more processors, cause the computing system to:

determine a plurality of vocal patterns of the voice data;

determine a similarity between the plurality of vocal patterns and a plurality of authenticated vocal patterns; and determine the distance based on a similarity between the plurality of vocal patterns and the plurality of authenticated vocal patterns.

11. The computing system of claim 10, wherein the similarity is based on a number of the plurality of vocal patterns that match the plurality of authenticated vocal patterns.

12. The computing system of claim 1, wherein the plurality of MFA inputs comprise an image of a face, and wherein the memory stores computer-readable instructions to determine whether a distance between the n-dimensional authenticated signature vector and the n-dimensional MFA vector is less than an authentication distance threshold that, when executed by the one or more processors, cause the computing system to:

determine a plurality of visual features of the image of the face;

determine a similarity between the plurality of visual features and a plurality of authenticated visual features; and determine the distance based on the similarity between the plurality of visual features and the plurality of authenticated visual features.

13. The computing system of claim 12, wherein the similarity is based on a number of the plurality of visual features that match the plurality of authenticated visual features.

14. The computing system of claim 1, wherein the plurality of MFA inputs comprise one or more biometric inputs, one or more alphanumeric inputs, or a personal identification number (PIN).

15. A method of multi-factor authentication (MFA), the method comprising:

receiving, by a computing device comprising one or more processors, from an authenticated entity, a plurality of authenticated inputs;

generating, by the computing device a plurality of normalized authenticated inputs;

generating, by the computing device, an n-dimensional authenticated signature vector corresponding to the plurality of normalized authenticated inputs;

receiving, by the computing device, a plurality of MFA inputs;

generating, by the computing device, a plurality of normalized MFA inputs;

generating, by the computing device, an n-dimensional MFA vector corresponding to the plurality of normalized MFA inputs;

determining, by the computing device, whether a distance between the n-dimensional authenticated signature vector and the n-dimensional MFA vector is less than an authentication distance threshold; and based on the distance between the n-dimensional authenticated signature vector and the n-dimensional MFA vector not exceeding the authentication distance threshold, generating, by the computing device, an indication that the plurality of MFA inputs have been authenticated.

16. The method of claim 15, wherein the plurality of MFA inputs comprise at least two different types of inputs, and wherein at least one of the two different types of inputs comprises a biometric input.

17. The method of claim 15, wherein the plurality of MFA inputs correspond to a plurality of weights, and wherein the distance between the n-dimensional authenticated signature vector and the n-dimensional MFA vector is based on the plurality of weights.

18. The method of claim 15, wherein the plurality of MFA inputs comprise an image of a fingerprint, and wherein the determining whether the distance between the n-dimensional authenticated signature vector and the n-dimensional MFA vector is less than the authentication distance threshold comprises:

determining, by the computing device, a plurality of fingerprint patterns of the fingerprint;

determining, by the computing device, a similarity between the plurality of fingerprint patterns and a plurality of authenticated fingerprint patterns; and determining, by the computing device, the distance based on a similarity between the plurality of fingerprint patterns and the plurality of authenticated fingerprint patterns.

19. The method of claim 15, wherein the authentication distance threshold is generated by one or more machine learning models, and further comprising:

accessing, by the computing device, authentication training data comprising a plurality of historical MFA inputs and a plurality of historical authenticated inputs;

generating, by the computing device, based on inputting the plurality of historical MFA inputs and the plurality of historical authenticated inputs into the one or more machine learning models, a plurality of predicted authentication distance thresholds;

determining, by the computing device, a similarity between the plurality of predicted authentication distance thresholds and a plurality of ground-truth authentication distance thresholds;

generating, by the computing device, based on the similarity between the plurality of predicted authentication distance thresholds and the plurality of ground-truth authentication distance thresholds, a distance threshold prediction accuracy of the one or more machine learning models; and adjusting, by the computing device, a weighting of one or more authentication distance threshold prediction parameters of the machine learning models based on the distance threshold prediction accuracy, wherein the weighting of the one or more authentication distance threshold prediction parameters that increase the distance threshold prediction accuracy is increased, and wherein the weighting of the one or more authentication distance threshold prediction parameters that decrease the distance threshold prediction accuracy is decreased.

20. One or more non-transitory computer-readable comprising instructions for multi-factor authentication (MFA) that, when executed by a computing platform comprising at least one processor, a communication interface, and memory, cause the computing platform to:

receive, from an authenticated entity, a plurality of authenticated inputs;

generate a plurality of normalized authenticated inputs;

generate an n-dimensional authenticated signature vector corresponding to the plurality of normalized authenticated inputs;

receive a plurality of MFA inputs;

generate a plurality of normalized MFA inputs;

generate an n-dimensional MFA vector corresponding to the normalized MFA inputs;

determine whether a distance between the n-dimensional authenticated signature vector and the n-dimensional MFA vector is less than an authentication distance threshold; and based on the distance between the n-dimensional authenticated signature vector and the n-dimensional MFA vector not exceeding the authentication distance threshold, generate an indication that the plurality of MFA inputs have been authenticated.

* * * * *